United States Patent [19]

Higbee

[11] Patent Number: 4,650,214

[45] Date of Patent: Mar. 17, 1987

[54] BELT TURNING RING AND CLAMPING DEVICE

[75] Inventor: Wallace C. Higbee, Romeo, Mich.

[73] Assignee: TRW Automotive Products Inc., Lyndhurst, Ohio

[21] Appl. No.: 809,418

[22] Filed: Dec. 16, 1985

[51] Int. Cl.$^4$ .................................................. B60R 22/00
[52] U.S. Cl. .................................... 280/808; 297/479
[58] Field of Search ...................... 280/801, 806, 808; 297/479, 480

[56] References Cited

U.S. PATENT DOCUMENTS

| | | | |
|---|---|---|---|
| 4,310,176 | 1/1984 | Furusawa et al. | 280/801 |
| 4,323,204 | 4/1982 | Takada | 280/806 |
| 4,480,804 | 11/1984 | Ando | 242/107.2 |
| 4,494,774 | 1/1985 | Fohl | 280/806 |

Primary Examiner—John J. Love
Assistant Examiner—Kenneth R. Rice
Attorney, Agent, or Firm—Tarolli, Sundheim & Covell

[57] ABSTRACT

A device for guiding and selectively clamping an occupant restraint belt used in a vehicle. The device has a frame with an opening through which the belt extends. The frame has two clamping surfaces that are spaced apart in the direction of belt extension. A clamp member moves between the first and second clamping surfaces transversely to the direction of belt extension to engage the belt and deform a portion of the belt into a serpentine configuration and to clamp the belt against the two clamping surfaces. The clamp member is moved relative to the clamping surfaces by a mechanism that responds to the application of force to the frame by the belt.

9 Claims, 5 Drawing Figures

BELT TURNING RING AND CLAMPING DEVICE

BACKGROUND OF THE INVENTION

This invention relates to a combination turning ring and clamping device for a shoulder belt in a vehicle.

Turning rings for a shoulder belt in a vehicle are known. A turning ring guides the shoulder belt across the upper torso of a vehicle occupant. Consequently, turning rings are typically located high on a vehicle's interior near an occupant's shoulder.

A combination turning ring and clamping device locks a shoulder belt to restrain the upper torso of a vehicle occupant upon excessive vehicle deceleration. One such combination turning ring and clamping device is described and illustrated in U.S. Pat. No. 4,494,774 to Fohl. The device in U.S. Pat. No. 4,494,774 includes a roller that is pivotally mounted in a frame. A shoulder belt is guided around the roller. In normal use, the belt slides on the roller. When the shoulder belt is pulled sharply, as when the vehicle is braked and the vehicle occupant is thrown against the belt, the roller pivots eccentrically in the frame and clamps the belt against a clamp member carried by the frame. The clamping occurs between a curved surface of the roller and a planar surface of the clamp member.

While there are a number of designs of turning ring and clamping devices, applicant is unaware of any combination turning ring and clamping device that has been commercially used. To applicant's knowledge, all existing designs have been impractical.

SUMMARY OF THE INVENTION

The present invention is a combination turning ring and clamping device for a shoulder belt. The clamping device includes a frame having an opening through which a shoulder belt extends. The frame carries a clamp member which moves relative to the frame to clamp the belt. A mechanism moves the clamp member relative to the frame in response to forces applied to the frame by the belt. This occurs when the occupant's upper torso moves as a result of sudden deceleration of the vehicle.

The present invention also allows self-aligning of the belt during initial clamping of the belt. In other words, the belt can shift relative to the clamp member in response to upper torso movement of the occupant. Shifting of the belt can occur because the clamp member is designed so that clamping of the belt begins only at the center of the belt. Since the belt is not clamped completely across its width, it can shift somewhat relative to the clamp member and the frame. This shifting reduces any tendency for the belt to rip at the clamp.

In one embodiment of the present invention, the frame is U-shaped and each of the leg portions of the frame has a clamping surface. The belt extends through openings in both leg portions and across both clamping surfaces. The clamp member moves between the leg portions of the frame. The clamp member has a portion which initially engages the central portion of the belt and other portions which thereafter clamp the side edge portions of the belt to thereby clamp the belt across the entire width of the belt.

The frame and clamp member are secured to the vehicle frame by a lever arrangement. The lever arrangement moves the clamp member relative to the frame to engage the belt upon a small amount of movement by the frame relative to the vehicle body or other member to which the frame is attached. Such movement of the frame is in response to a force applied by the belt to the frame. Movement of the clamp member clamps the belt against the frame.

BRIEF DESCRIPTION OF THE DRAWINGS

The above and further features of the present invention will become apparent to those skilled in the art to which the invention relates from a reading of the following specification made with reference to the accompanying drawings in which.

DETAILED DESCRIPTION OF A PREFERRED EMBODIMENT

Figure 1:
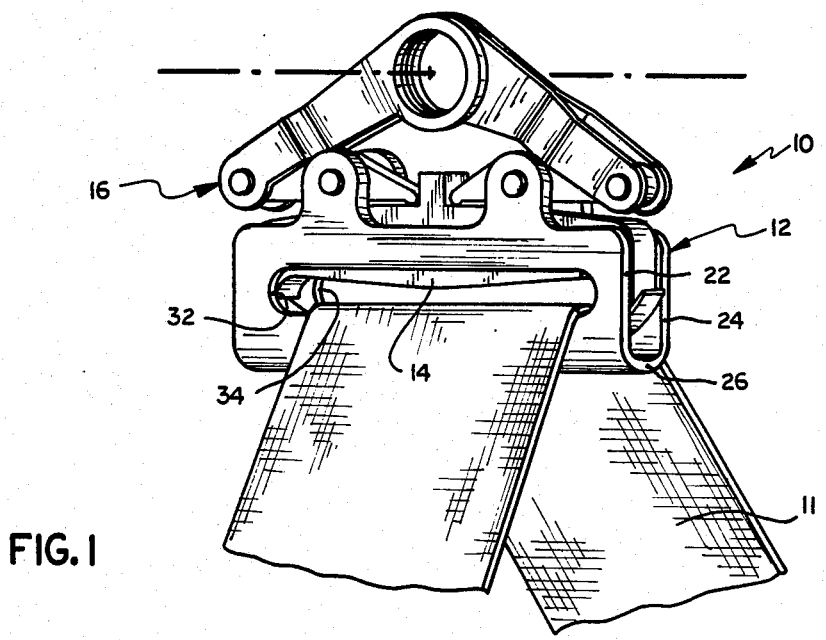
FIG. 1 is a perspective view of a belt turning ring and clamping device embodying the present invention.

FIG. 1 illustrates a shoulder belt turning ring and clamping device 10 according to the present invention. The device 10 is mounted in any suitable location in a vehicle. Preferably, it is mounted on a vehicle door pillar adjacent the shoulder of a vehicle occupant. The device 10 guides a shoulder belt 11, which is attached at one end to a retractor (not shown). The turning ring and clamping device 10 includes a frame 12, a clamp member 14, and a lever arrangement 16 for moving the clamp member relative to the frame to clamp the belt 11.

Frame 12 and clamp member 14 are secured to the vehicle by the lever arrangement 16. The lever arrangement 16 includes mounting levers 82 and 84 and actuation levers 92 and 94. Mounting lever 82 is pivotally connected at one end to one end of mounting lever 84. The interconnected ends of levers 82 and 84 are pivotally attached to the vehicle door pillar A at pivot 86. The other end of mounting lever 82 is pivotally attached to one end of actuating lever 92 at pivot 102. The other end of mounting lever 84 is pivotally attached to one end of actuating lever 94 at pivot 104. The other end of actuating lever 92 has a contact surface 106 in sliding engagement with lever contact surface 56 of the clamp member 14. The other end of actuating lever 94 has a contact surface 108 which is also in sliding engagement with lever contact surface 56 of the clamp member 14. Actuating lever 92 is pivotally connected intermediate its ends to frame 12 at pivot 112. The frame 12 is similarly pivotally connected to actuating lever 94 intermediate its ends at pivot 114.

The frame 12 is generally U-shaped and has two leg portions 22, 24 connected by a base portion 26. An opening 32, 34 is formed in each leg portion 22, 24. Belt clamping surfaces 42, 44 (FIG. 4) on the frame leg portions 22, 24 partially define the openings 32, 34, respectively. The belt 11 extends through openings 32, 34 in the frame 12 across surfaces 42 and 44.

Clamp member 14 is located between and can be moved relative to the leg portions 22, 24. The clamp member 14 has a lower belt contact surface 58. The belt contact surface 58 extends lengthwise of the clamp member 14. Also extending lengthwise of the clamp member 14, adjacent and at an angle to the surface 58, are clamp surfaces 52 and 54, best shown in FIG. 4.

Figure 5:
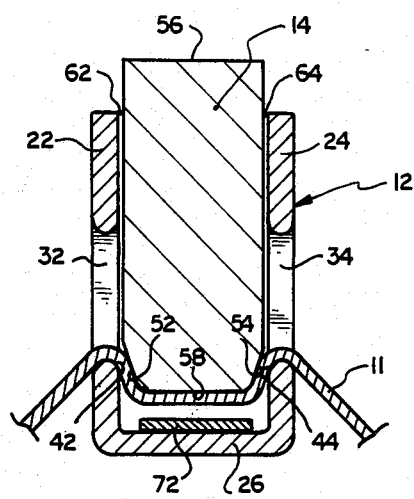
FIG. 5 is a fragmentary sectional view taken approximately along line 5—5 of FIG. 3.

Between the clamp member 14 and leg portions 22, 24 of the frame are respective clearances 62, 64. Clearances 62 and 64 are approximately 1/3 to 1/2 of the thickness of the belt 11. Clearances 62, 64 are large enough to assure unrestricted movement of the clamp member 14 between the leg portions 22, 24. At the same time, clearances 62, 64 are small enough to assure that the belt 11 is compressed between the frame 12 and clamp member 14 when the device 10 is actuated to clamp the belt, as seen in FIG. 5.

Figure 2:
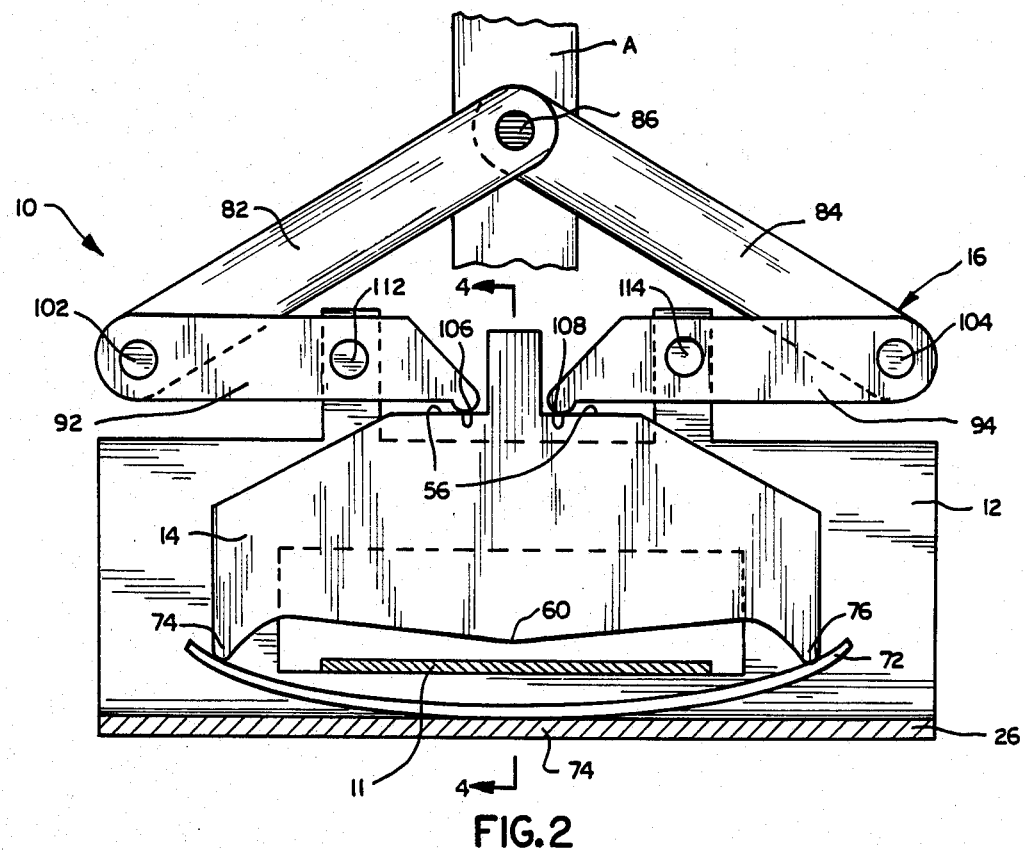
FIG. 2 is a side view, partially in section, illustrating the device of FIG. 1 before clamping a belt.
Figure 3:
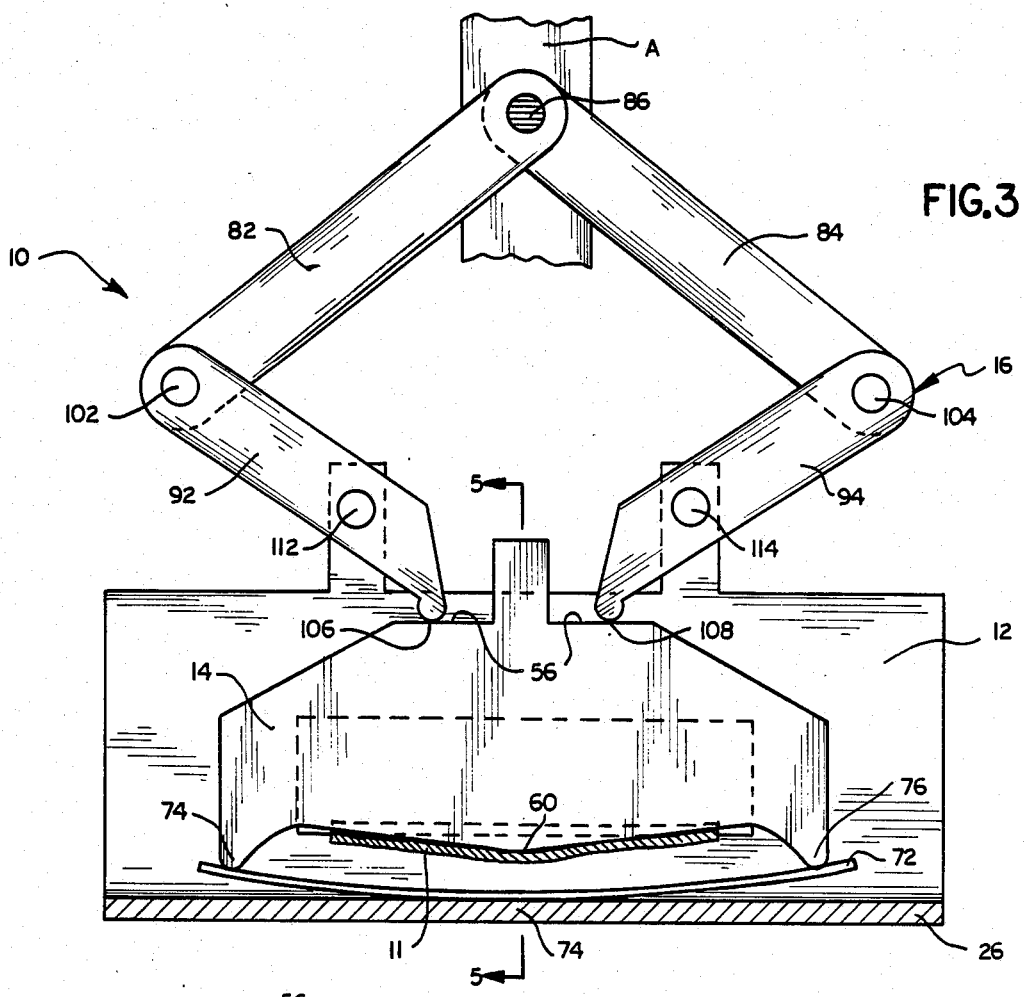
FIG. 3 is a side view, partially in section, illustrating the device of FIG. 1 clamping a belt.

Belt contact surface 58 of clamp member 14, as viewed along its length in FIG. 2, is slightly V-shaped with a central belt contact portion 60. The central belt contact portion 60 initially engages the central part of the belt 11 upon movement of the clamp member 14 relative to the frame 12 (FIG. 3). Since the clamp member 14 initially engages the belt 11 in its center, the belt is not completely clamped and may shift relative to the frame 12. As a result, the belt 11 may follow movement of the occupant's torso, and the possibility of belt tearing at the clamp is minimized.

A bowed spring 72 (FIG. 2) extends lengthwise of clamp member 14. The upturned ends of the spring engage opposite ends 74 and 76 of the clamp member 14. The center portion of the spring 72 engages the center portion 74 of the base portion 26 of the frame 12. As a result, the spring 72 normally biases the clamp member 14 away from the base portion 26 of the frame 12 and the belt 11. The belt 11 can thus move freely through the openings 32 and 34 in the leg portions of the frame. The rate of the spring 72 is selected so that, in predetermined situations, its bias is overcome to allow the clamp member 14 to move relative to the frame 12 to engage the belt 11.

Figure 4:
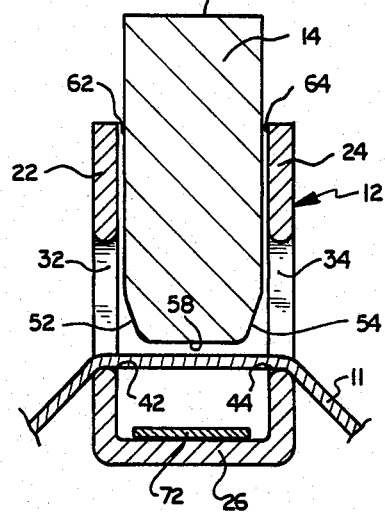
FIG. 4 is a fragmentary sectional view taken approximately along line 4—4 of FIG. 2.

During normal operation of the vehicle, the turning ring and clamping device 10 is in the nonactuated position illustrated in FIGS. 1, 2 and 4. In emergency situations, when the vehicle is rapidly decelerating, the upper torso of the vehicle occupant moves against belt 11. Since the belt 11 is supported by the frame 12, the force applied to the belt by the occupant's torso is transmitted to the frame. If the force applied to the frame 12 is larger than the biasing force of spring 72, the turning ring and clamping device 10 is actuated. The force acting on the frame 12 causes the frame to move relative to the vehicle door pillar A, pulling the actuating levers 92 and 94 at pivots 112 and 114, respectively. Actuating lever 92 rotates about pivot 102 so that contact area 106 pushes clamp member 14 downward relative to the frame 12 toward belt 11. At the same time, actuating lever 94 rotates about pivot 104 so that contact area 108 also pushes clamp member 14 downward relative to the frame 12 toward the belt 11. Since the frame 12 is pivotally connected to actuating levers 92 and 94 intermediate their respective contact areas 106 and 108 and their pivots 102 and 104, the clamp member 14 moves a greater distance relative to the vehicle door pillar A than the frame 12.

Upon continued force being transmitted to the frame 12, the clamp member 14 will move a sufficient distance that belt contact surface 58 engages the belt 11. Further movement of clamp member 14 deforms the belt 11 into a serpentine shape as seen in FIG. 5. The belt 11 is then clamped between clamping surface 42 and clamp surface 52 and between clamping surface 44 and clamp surface 54. When the emergency situation is over, as when the vehicle stops decelerating, the force applied to the belt 11 will lessen. The spring 72 will then bias the clamp member 14 away from the belt 11 and return the turning ring and clamping device 10 to the nonactuated condition shown in FIGS. 1, 2 and 4.

It is obvious that different embodiments of the present invention can be made without detracting from the spirit of the present invention. For example, a different lever arrangement 16 could be used to produce the desired clamping action.

Having described a specific preferred embodiment of the invention, I claim:

1. A device for guiding and selectively clamping a vehicle occupant restraint belt comprising:
   a frame having at least one opening through which the belt can extend, said frame having a first clamping surface and a second clamping surface spaced apart from said first clamping surface in the direction of belt extension;
   means supporting said frame for movement upon application of a predetermined force to said frame by the belt;
   a clamp member disposed in a plane which is located intermediate said first and second clamping surfaces and which is oriented transversely of the belt; and
   means interconnecting said frame and said clamp member for moving said clamp member in response to movement of said frame in the same direction as said frame while simultaneously moving said clamp member relative to said frame to clamp the belt between said clamp member and said clamping surfaces upon application of said predetermined force to said frame by the belt, said clamp member having portions for engaging the belt and causing a portion of the belt to assume a serpentine configuration and to clamp said belt against said first and second clamping surfaces.

2. A device as set forth in claim 1 wherein said frame is U-shaped and has a first leg portion, a second leg portion spaced apart from the first leg portion, and a base portion connecting the first and second leg portions, said first leg portion having formed in it a first opening and said second leg portion having formed in it a second opening through which the belt can extend, said first and second clamping surfaces being disposed on the first and second leg portions, respectively, and partially defining said first and second openings, respectively.

3. A device for guiding and selectively clamping a vehicle occupant restraint belt comrising:
   a frame having at least one opening through which the belt can extend, said frame having a first clamping surface and a second clamping surface spaced apart from said first clamping surface in the direction of belt extension;
   a clamp member disposed in a plane which is located intermediate said first and second clamping surfaces and which is oriented transversely relative to the direction of belt extension, the clamp member being movable relative to the clamping surfaces to engage the belt and cause a portion of the belt to assume a serpentine configuration and to clamp said belt against said first and second clamping surfaces; and
   means for moving said clamp member between said first and second clamping surfaces to clamp the belt in response to the application of force to said frame by the belt, said means for moving said clamp member between said first and second clamping surfaces to clamp the belt including a first pair of levers, each lever of said first pair of levers having a first end portion for coupling to the vehicle, a second end portion for engaging the clamp member, and an intermediate portion pivotally connected to said frame, said frame being movable in response to forces applied by the belt to the frame to pivot said levers to move said clamp member to engage the belt.

4. A device as set forth in claim 3 further comprising spring means for applying a predetermined biasing force to said clamp member to bias said clamp member away from the belt, said biasing force being overcome in response to the application of a predetermined force to said frame by the belt.

5. A device as set forth in claim 3 wherein said clamp member has a V-shaped surface for initially clamping only a central portion of the belt while leaving edge portions of the belt free so that the belt can shift relative to said frame and said clamp member.

6. A device as set forth in claim 3 wherein said means for moving said clamp member also includes a second pair of levers, each lever of said second pair of levers having a first end portion for coupling to the vehicle and a second end portion pivotally connected to a first end portion of a different one of said levers of said first pair of levers.

7. A device for guiding and selectively clamping a vehicle occupant restraint belt, said device comprising:

first and second clamp members between which the belt can extend; and means for moving said first and second clamp members relative to each other into clamping engagement with the belt in response to a force applied by the belt to at least one of said first and second clamp members, said means for moving said clamp members into clamping engagement including a first pair of levers, each lever of said first pair of levers having a first end portion, a second end portion for engaging one of said clamp members and a portion intermediate said first and second end portions pivotally connected to said one of said clamp members; and a second pair of levers, each lever of said second pair of levers having a first end for pivotally mounting to the vehicle and a second end portion pivotally connected to a first end portion of a different one of said first pair of levers.

8. A device as set forth in claim 7 further comrising a spring which engages said first and second clamp members to bias said clamp members away from clamping engagement with the belt.

9. A device as set forth in claim 7 wherein one of said clamp members has a clamp surface portion which engages only a center portion of the belt before edge portions of the belt are engaged by said one clamp member so that the belt can pivot relative to the clamp members in response to occupant movement before the edge portions of the belt are engaged by said one clamp member.

* * * * *